United States Patent [19]

Louise et al.

[11] Patent Number: 5,478,534
[45] Date of Patent: Dec. 26, 1995

[54] APPARATUS FOR PREPARING ULTRA-PURE NITROGEN

[75] Inventors: Jean Louise, Villejuif; Bertrand Mollaret, Viroflay; Jean-Yves Thonnelier, Voisins le Bretonneux; Daniel Gary, Montigny le Bretonneux, all of France

[73] Assignee: L'Air Liquide, Societe Anonyme pour l'Etude et l'Exploitation des Procedes Georges Claude, Paris, France

[21] Appl. No.: 101,984

[22] Filed: Aug. 4, 1993

Related U.S. Application Data

[62] Division of Ser. No. 685,174, Apr. 15, 1991, Pat. No. 5,238,670.

[30] Foreign Application Priority Data

Apr. 20, 1990 [FR] France ................................ 90 05065
Oct. 22, 1990 [FR] France ................................ 90 13039

[51] Int. Cl.⁶ .............. B01J 8/04; C01B 21/04; C01B 31/18
[52] U.S. Cl. .......... 422/188; 422/189; 473/247; 473/351; 203/49
[58] Field of Search .................. 422/169, 188, 422/189, 191, 192; 423/213.7, 219, 239, 247, 251

[56] References Cited

U.S. PATENT DOCUMENTS

| | | | |
|---|---|---|---|
| 2,826,480 | 3/1958 | Webster | 423/351 |
| 3,545,915 | 12/1970 | Lutchko et al. | 423/247 |
| 4,003,979 | 1/1977 | Kanno | 423/247 |
| 4,019,879 | 4/1977 | Rabo et al. | 55/68 |
| 4,464,191 | 8/1984 | Erickson | 62/31 |
| 4,579,723 | 4/1986 | Weltmer et al. | 423/219 |
| 4,723,975 | 2/1988 | Atkinson et al. | 62/29 |
| 4,869,883 | 9/1989 | Thorogood et al. | 423/219 |
| 4,917,771 | 4/1990 | Xie et al. | 55/68 |
| 4,960,579 | 10/1990 | Campbell | 423/351 |
| 5,061,464 | 10/1991 | Cardonna, Jr. et al. | 423/247 |
| 5,185,139 | 2/1993 | Krishnamurthy et al. | 423/359 |
| 5,204,075 | 4/1993 | Jain et al. | 423/219 |

FOREIGN PATENT DOCUMENTS

| | | |
|---|---|---|
| 0154855 | 7/1989 | European Pat. Off. . |
| 1475657 | 4/1967 | France . |
| 21742 | 10/1964 | Japan . |

OTHER PUBLICATIONS

"Purification of technical–grade gases for use in the manufacture of optical fibers", Chemical Abstracts, vol. 111, No. 18, Oct. 30, 1989, No. 156875k, By V. Fainshtein et al.
"Equipment and process for producing superpure nitrogen from common nitrogen", Chemical Abstracts, vol. 107, No. 20, Nov. 1987, No. 179402k, By D. Cheng et al., p. 202.
"Catalyst for removal of hydrogen and oxygen from inert gases", Chemical Abstracts, vol. 107, No. 20, Nov. 1987, No. 179503a, By Y. Chen et al, p. 211.

Primary Examiner—Robert J. Warden
Assistant Examiner—Christopher Y. Kim
Attorney, Agent, or Firm—Young & Thompson

[57] ABSTRACT

Process for preparing ultra-pure nitrogen containing less than 100 ppb (parts per billion) impurities, characterized in that at least the impurities consisting of carbon monoxide (CO) and/or hydrogen ($H_2$) are removed by passing the gas from which at least one of these two components has to be removed, over a bed of particles including a metallic element namely copper (Cu) and/or ruthenium (Ru) and/or rhodium (Rh) and/or palladium (Pd) and/or osmium (Os) and/or iridium (Ir) and/or platinum (Pt) supported on a particulate support, by the technique of ion exchange and/or by the technique of impregnation. This technique enables to produce ultra-pure nitrogen by using it either with nitrogen obtained by distillation, or air to be distilled as an additional step for the removal of $CO_2$ and $H_2O$. A device for carrying out the process constitutes another object of the invention.

6 Claims, No Drawings

APPARATUS FOR PREPARING ULTRA-PURE NITROGEN

This application is a division of application Ser. No. 07/685,174, filed Apr. 15, 1991, now U.S. Pat. No. 5,238,670.

BACKGROUND OF INVENTION (a) Field of the Invention

The present invention concerns the preparation of ultra-pure nitrogen, having an amount of residual impurities (essentially CO, $H_2$, $CO_2$, $H_2$ and $O_2$) lower than a few tens of ppb (parts by billion), generally less than 10 ppb, and, even still less, of the order of 1 ppb.

(b) Description of Prior Art

Pure nitrogen is generally obtained by cryogenic distillation of air, which enables to separate nearly all of the oxygen, while carbon dioxide and water vapor have previously been removed by being blocked on an adsorbent before distillation.

However, carbon monoxide (CO) and hydrogen ($H_2$) which are present in the air are found again in nitrogen after distillation, unless there is provided, in the case of hydrogen, the addition of a complementary distillation column, which has been found to be particularly costly.

This is the reason why, presently, air is pretreated after compression and before being sent towards the drying and decarbonating device, by catalytic means utilising precious metals such as platinum and palladium supported on alumina and at elevated temperature, above 100° C. or in the case of carbon monoxide, copper oxide CuO at a temperature of the order of 150° C., after which the air thus purified can be sent towards the distillation column, but this operation at elevated temperature which is carried out on the entire flow of air is also costly and it is difficult to achieve the aimed limit of 10 ppb, for carbon monoxide as well as for hydrogen, in which the residual amounts remain of the order of 100 ppb.

In the document U.S. Pat. No. 4,869,883, it has been proposed to use purifiers which treat nitrogen at elevated temperature to remove CO, $CO_2$, $H_2O$, $O_2$, $H_2$, and which operate by removing oxygen by reaction with CO and/or $H_2$ with Cu with production of $CO_2$ and/or $H_2O$, by removal of CO and/or $H_2$ on CuO, followed by removal of $CO_2$ and $H_2O$ on molecular sieves, possibly preceded by a bed of alumina. Such purifiers are relatively complicated to operate and, for example, require a large number of high pressure reservoirs at elevated temperature. A process of the same type operating at room temperature on a nickel base catalyst (NiO and Ni with about 50% by weight of Ni with at least 5% by weight of Ni in the form of Ni metal) is described in the document E.P.-A-240,270, which enables to reduce the amount of impurities to below 100 ppb. It has the disadvantage of requiring a regeneration utilising a gas containing hydrogen. Generally, attempts have even been made to block CO and $H_2$ by adsorption, however the adsorbents or known sieves do not operate for $H_2$ and are not very efficient for CO. For example, the 13X molecular sieve blocks $CO_2$ but very little CO. However, it is known that the efficiency of these adsorbents may be improved by exchange of copper ions (Cu) or impregnation of palladium (Pd), but no proposal has yet been made to adapt this technique to the preparation of ultra-pure nitrogen.

SUMMARY OF INVENTION

It is an object of the present invention to provide a process which is simple, efficient and not very costly for the preparation of ultra-pure nitrogen reaching the following double aim:

a very low limit of blocking, of the order of 10 ppb with a ratio of quantity of gas to be treated/quantity of blocked product enabling an operation at reduced costs.

For this purpose, according to the invention, at least the impurities consisting of carbon monoxide (CO) and/or hydrogen ($H_2$) are substantially removed by passing air from which at least one of these two components are intended to be removed over a bed consisting of particles of at least one metallic element, selected from copper (Cu) and/or ruthenium (Ru) and/or rhodium (Rh) and/or palladium (Pd) and/or osmium (Os) and/or iridium (Ir) and/or platinum (Pt), supported on a support of particulate material of high surface area, the operation of supporting the metallic element being carried out by a technique, known per se, of ion exchange and/or impregnation. According to the invention, copper and/or either of the six metals of group VIII of the periodic classification of the elements belonging to the platinum family are used as metallic element on a suitable support of particulate material which can be zeolite, and/or alumina and/or silica. Preferably, either of the six metals of group VIII are used.

Within the scope of the present invention, the term "metallic element" includes metal particles in reduced state or an ionic species.

Before the treatment according to the process of the invention, the gases to be purified normally contain less than 40 ppm, more generally less than 10 ppm carbon monoxide and equivalent amounts of hydrogen.

The initial preparation of the support of metallic elements in particulate form used in the invention is carried out in three steps, namely:

an operation of pretreatment of the support of particulate material;

a contact of a solution containing a precursor of the metallic element with the support of particulate material;

a progressive drying, preferably by flushing with a neutral gas such as nitrogen;

Contact is carried out either with an excess of solution which is thereafter separated from the support of particulate material after a certain contact time (technique of ion exchange), or with a quantity of solution equal to that which the support of particulate material can absorb (technique of impregnation). Preferably, said solution is an aqueous solution.

If it is desired to have the metallic element in the form of particles of metal in reduced state, there may be provided a fourth step of reduction, for example by means of a gas containing hydrogen, at elevated temperature.

In the particular case of copper on a support of particulate zeolite, it has been observed during tests that the weight of the metallic element with respect to the total weight of the bed of particulate zeolite support was between 10% and 15%. In all the other cases, a weight of the active metallic element with respect to the total weight of the support of particulate material of between 0.1% and 5% is sufficient.

Depending on cases, the operation of removal of the CO and/or $H_2$ impurities is carried out either at a temperature in the vicinity of room temperature, between 0° C. and 50° C., possibly as low as −30° C., or at an elevated temperature above 100° C.

The invention thus finds application, on the one hand in the final purification of nitrogen obtained by cryogenic distillation of air, where the main removal of the CO impurity is ensured by passage of the nitrogen obtained by distillation at a temperature in the vicinity of room temperature between 0° C. and 50° C. on a bed consisting of particles of at least one metallic element selected from copper (Cu) and/or ruthenium (Ru) and/or rhodium (Rh) and/or palladium (Pd) and/or osmium (Os) and/or iridium (Ir) and/or platinum (Pt), while the removal of the impurity consisting of hydrogen is ensured by passage at a temperature in the vicinity of room temperature of nitrogen on a bed consisting of particles of at least one metallic element selected from ruthenium (Ru) and/or rhodium (Rh) and/or palladium (Pd) and/or osmium (Os) and/or iridium (Ir) and/or platinum (Pt).

The invention can be used for the purification of air before distillation thereof by passage, after removal by adsorption in a dryer-decarbonator of at least the water vapor, at a temperature in the vicinity of room temperature between 0° C. and 50° C., of the air to be distilled over a bed consisting of particles of at least one metallic element selected from copper (Cu) and/or ruthenium (Ru) and/or rhodium (Rh) and/or palladium (Pd) and/or osmium (Os) and/or iridium (Ir) and/or platinum (Pt) to block carbon monoxide and, in the case where the first bed of particles is exclusively a bed of particles of copper, the next step includes blocking hydrogen, on a second bed of particles consisting of particles of metallic elements selected from ruthenium (Ru) and/or rhodium (Rh) and/or palladium (Pd) and/or osmium (Os) and/or iridium (Ir) and/or platinum (Pt), supported on a support of particulate material. It may be sufficient, possibly, to operate in such a manner that the air from which at least water vapor has been removed passes at a temperature in the vicinity of room temperature between 0° C. and 50° C. through a bed of particles of copper supported on a support of particulate material to block only carbon monoxide.

As a variant, air to be distilled is treated at elevated temperature of the order of 100° C. to 300° C. through either a single bed of particles of at least one metallic element selected from copper (Cu) and/or ruthenium (Ru) and/or rhodium (Rh) and/or palladium (Pd) and/or osmium (Os) and/or iridium (Ir) and/or platinum (Pt) supported on particulate zeolite support, or a double bed which comprises a first bed of particles of copper and a second bed of particles of at least one metallic element selected from ruthenium (Ru) and/or rhodium (Rh) and/or palladium (Pd) and/or osmium (Os) and/or iridium (Ir) and/or platinum (Pt) supported on a particulate zeolite support. As a variant, there is first provided a main drying, then a treatment at elevated temperature on such beds of particles of at least one metallic element selected from copper (Cu) and/or ruthenium (Ru) and/or rhodium (Rh) and/or palladium (Pd) and/or osmium (Os) and/or iridium (Ir) and/or platinum (Pt) supported on a zeolitic support of particulate material followed by a final complementary drying and decarbonation.

However it has been found particularly advantageous to regenerate the bed consisting of particles of at least one metallic element selected from copper (Cu) and/or ruthenium (Ru) and/or rhodium (Rh) and/or palladium (Pd) and/or osmium (Os) and/or iridium (Ir) and/or platinum (Pt), supported on a support of particulate material, with a gas, such as nitrogen, for example one resulting from distillation, at a temperature above 100° C.

In the embodiments operating at a temperature in the vicinity of room temperature on air to be distilled, the invention also concerns a device for the preparation of ultra-pure nitrogen, where at least one bed for blocking hydrogen and carbon monoxide is disposed inside a single enclosure, the operation being carried out by means of two identical enclosures, one operating at room temperature for the purification, while the other operates as a regeneration, as a result of an increase of temperature and/or a decrease of pressure, possibly below atmospheric pressure, and/or of a dilution flushing with the gas to be purified and/or of the oxygen enriched air.

In the embodiment operating at a temperature in the vicinity of room temperature, the invention concerns a device for purifying air intended to be distilled, with beds of particulate support to block hydrogen and carbon monoxide associated with the beds of adsorbents intended to block water vapor (such as alumina) and of molecular sieve (such as zeolite 13X) to block carbon dioxide, water vapor and other polluting agents, into a single blocking enclosure. Preferably the beds of particulate support blocking hydrogen and carbon monoxide are disposed downstream of at least the bed for blocking water vapor, and, in addition, the blocking enclosure comprises, preferably downstream of the beds for blocking $H_2$ and CO, additional beds for the final blocking of traces of water vapor and carbon dioxide.

The invention also aims at a process for the preparation of ultra-pure nitrogen of the type mentioned above, in which nitrogen obtained by distillation additionally contains oxygen ($O_2$) as an impurity, in which there is associated with the removal of CO and/or $H_2$ described above, a removal of the residual $O_2$ impurity. Steps are then taken so that before the final purification, the nitrogen obtained by distillation contains a number of moles of (CO+$H_2$), possibly by addition of said gases, more than double the number of moles of the oxygen impurity ($O_2$). The bed consisting of particles of at least one metallic element, selected among ruthenium (Ru) and/or rhodium (Rh) and/or palladium (Pd) and/or osmium (Os) and/or iridium (Ir) and/or platinum (Pt), supported on a particulate support, acts as a catalyst which enables to completely remove $O_2$, by reduction of CO and/or $H_2$, with production respectively of $CO_2$ and/or $H_2O$. The impurities CO and/or $H_2$ which have not reacted with $O_2$ are removed by passage over the bed of particles of metallic elements.

The invention is now illustrated by the embodiments which follow, which outline certain results according to the invention and others which are inoperative:

Results:

($Ncm^3$ express the volume in $cm^3$ at 0° C. and under one atmosphere)

On nitrogen at room temperature:

Cu exchanged sieve: no $H_2$ block
  CO block: <2 ppb
  rate of adsorption upon through flow =0.42 $Ncm^3/g$
  ($Ncm^3$ of CO per gram of adsorbent)

Pd impregnated sieve: Co=15 ppb
  $H_2$<10 ppb
  rate of adsorption upon through flow=0.27 $Ncm^3/g$
  ($Ncm^3$ of CO and $H_2$ per gram of adsorbent)

Cu+exchanged sieve
  Pd impregnated sieve: CO<2 ppb
    $H_2$<3 ppb
    rate of adsorption upon through flow=0.67 $Ncm^3/g$
    ($Ncm^3$ of CO and $H_2$ per gram of adsorbent)

There are simultaneously obtained low limits as well as interesting yields. Reversibility has been established by repeating the tests.

On air at room temperature:

Cu exchanged sieve: no $H_2$ block
  CO block: Limit=6 ppb
  rate of adsorption upon through flow=0.16 $Ncm^3/g$
  ($Ncm^3$ of CO per gram of adsorbent)

Pd impregnated sieve: CO=6 ppb
  $H_2$=10 to 20 ppb during 10 days formation of $CO_2$ in the reactor which is thereafter removed at room temperature.
On air at elevated temperature:
Cu+exchanged sieve
Pd impregnated sieve at 100° C.:$H_2$>10 ppb
CO=7 ppb

EXAMPLES OF OPERATION

There is prepared a first bed of zeolites of type 5A (24.6 g) of which 60% of the ions are exchanged with $Cu^{2+}$ions and a second bed of mordenite (23 g) impregnated with 3.5% (by weight) of palladium, in two columns having a diameter of 12 mm and a length of 250 mm and the following tests are carried out:

first test:
Cryogenic nitrogen ($N_2$) is passed in the columns, at a flow of 126 Nl/h under 7 bar at room temperature, having a water content below than 150 ppb, a CO content of 2 ppm (part per million $10^{-6}$) and an amount of hydrogen content of 1.7 ppm. At the exit, nitrogen contains only an amount of CO of the order of 1 ppb and an amount of hydrogen lower than 3 ppb. This result is maintained for a period of 67 hours.

second test:
Air having a water content lower than 150 ppm, a CO content of 2 ppm and a content of $H_2$ of 1.3 ppm. is passed in the columns, at a rate of 126 Nl/h under 7 bar, at room temperature. The air which exits has a CO content of 6 ppb and a hydrogen content of 10 to 20 ppb which is kept constant for a minimum of 10 days.

third test:
This test is identical to the second test, except that the air is heated at 100° C. The air which exits has a CO content of 7 ppb and a hydrogen content lower than 10 ppb.

The invention applies to the preparation of ultra-pure nitrogen, for example used in the electronic industry.

We claim:

1. Apparatus for preparing ultra-pure nitrogen from air, which comprises:
    a) means for removing at least one of hydrogen and carbon monoxide from said air, said means comprising a particulate support and on said support at least one element selected from the group consisting of copper, ruthenium, rhodium, palladium, osmium, iridium and platinum, said support being disposed in two identical enclosures one operating on stream while the other is regenerated;
    b) bed means fluidly connected to and disposed downstream of said means for removing at least one of hydrogen and carbon monoxide for thereafter removing water vapor and carbon dioxide from the air; and
    c) an air distillation column fluidly connected to and disposed downstream of said bed means for thereafter separating ultra-pure nitrogen from said air.

2. Apparatus as claimed in claim 1 further comprise bed means upstream of said particulate support for removing water vapor by adsorption from said air.

3. Apparatus according to claim 1, wherein said means for removing at least one of hydrogen and carbon monoxide and said bed means removing water vapor and carbon dioxide are disposed in a single enclosure.

4. Apparatus for separating ultra-pure nitrogen from air, which comprises:
    a) two identical enclosures each enclosing a bed for removing hydrogen and carbon monoxide from said air, said bed comprising a particulate support supporting at least one element selected from the group consisting of ruthenium, rhodium, palladium, osmium, iridium and platinum, and a bed for removing water vapor and carbon dioxide from said air, one of said enclosures being on stream while the other is regenerated; and
    b) an air distillation column fluidly connected to said enclosures for thereafter separating ultra-pure nitrogen from said air.

5. Apparatus as claimed in claim 4, wherein each said enclosure also includes a bed for removing water vapor by adsorption and disposed upstream of said bed for removing hydrogen and carbon monoxide.

6. Apparatus for preparing ultra-pure nitrogen from air, which comprises:
    a) means for removing at least one of hydrogen and carbon monoxide from said air, said means comprising a particulate support and on said support at least one element selected from the group consisting of ruthenium, rhodium, palladium, osmium, iridium and platinum, said support being disposed in two identical enclosures one operating on stream while the other is regenerated;
    b) an air distillation column fluidly connected to and disposed downstream of said means for removing at least one of hydrogen and carbon monoxide for thereafter separating ultra-pure nitrogen from said air.

* * * * *